United States Patent [19]

Link

[11] 3,780,766
[45] Dec. 25, 1973

[54] AUTOMATIC TIMING OF WATERING CONTROL SYSTEMS

[76] Inventor: Gustav A. Link, 3961 Mission Rd., Los Angeles, Calif. 90031

[22] Filed: Jan. 8, 1973

[21] Appl. No.: 321,790

[52] U.S. Cl................... 137/624.2, 239/70, 239/69
[51] Int. Cl....................... A01g 27/00, F16r 31/04
[58] Field of Search................. 137/624.11, 624.18, 137/624.2, 624.17; 239/69, 70, 66

[56] References Cited
UNITED STATES PATENTS
3,379,894    4/1968    Carsten............................ 239/70 X

*Primary Examiner*—Alan Cohan
*Attorney*—Fred N. Schwend

[57] ABSTRACT

A watering or sprinkling control device for large areas comprising a motor driven timing rotor having timing control knobs at different control stations therearound representing different areas to be successively watered and wherein the knobs are adjustable relative to suitable indicia to predetermine the length of time watering is to occur in respective ones of the areas or, alternatively, to omit watering of such areas.

11 Claims, 8 Drawing Figures

AUTOMATIC TIMING OF WATERING CONTROL SYSTEMS

BACKGROUND OF THE INVENTION

1. Field of the Invention

This invention relates to automatic time controlled watering systems and has particular reference to control devices for automatically controlling the time of watering or sprinkling different subdivided areas or sections within a given area.

2. Description of the Prior Art

When sprinkling or otherwise watering large areas, such as golf courses, it is desirable to successively water different sections thereof at different times in order to maintain a sufficient water pressure so that each sprinkler head or the like may cover an adequate area. Also, it may be desirable to water certain sections at different times of the day only. Again, it is usually desirable to water certain sections more than others. For example, shaded areas doe not require as much watering as those areas which are exposed to the sun.

Watering control systems of the above type have been in use heretofore. For example, in my U.S. Pats., No. 3,000,398, issued on Sept. 19, 1961 and No. 3,234,448, issued on Feb. 8, 1966, I have disclosed and claimed relatively simple water control systems, each including a motor driven rotatable timing device. Replaceable pins are mounted in the timing device at different stations therearound representing different areas to be watered. As the timing device turns, the pins open and close different motor control circuits to control the duration of the watering period in each area. By adding or removing different pins at any one station, watering in the repective area can be skipped entirely.

Such watering control systems work satisfactory; however, since the replaceable pins are loose items they are often lost or misplaced. Also, at times there may be an insufficient number of pins on hand to properly control watering. Thus, the use of replaceable pins for controlling the duration of watering in different areas tends to become a nuisance.

SUMMARY OF THE INVENTION

According to the present invention, a simple and inexpensive control system is provided in which adjustable knobs, in lieu of replaceable pins, are provided on a motor driven timing rotor for controlling the length of time watering is to occur in different areas. Such adjustable knobs are settable relative to suitable indicia to readily predetermine the duration of water for each area or to skip watering entirely.

Accordingly, the principle object of the present invention is to provide a simple, inexpensive and easily adjustable automatic watering control system of the above type which is devoid of any replaceable pins or like elements.

Another object is to provide a system of the above type including a rotatable timing device containing a plurality of control stations, one for each area to be watered, and in which an adjustable control knob is provided at each control station effective to vary the duration of the watering period for the respective station or alternatively to skip watering in that area.

BRIEF DESCRIPTION OF THE DRAWINGS

The manner in which the above and other objects of the invention are accomplished will be readily understood on reference of the following specification when read in conjunction of the accompanying drawings, wherein.

DESCRIPTION OF PREFERRED EMBODIMENT

Figure 5:
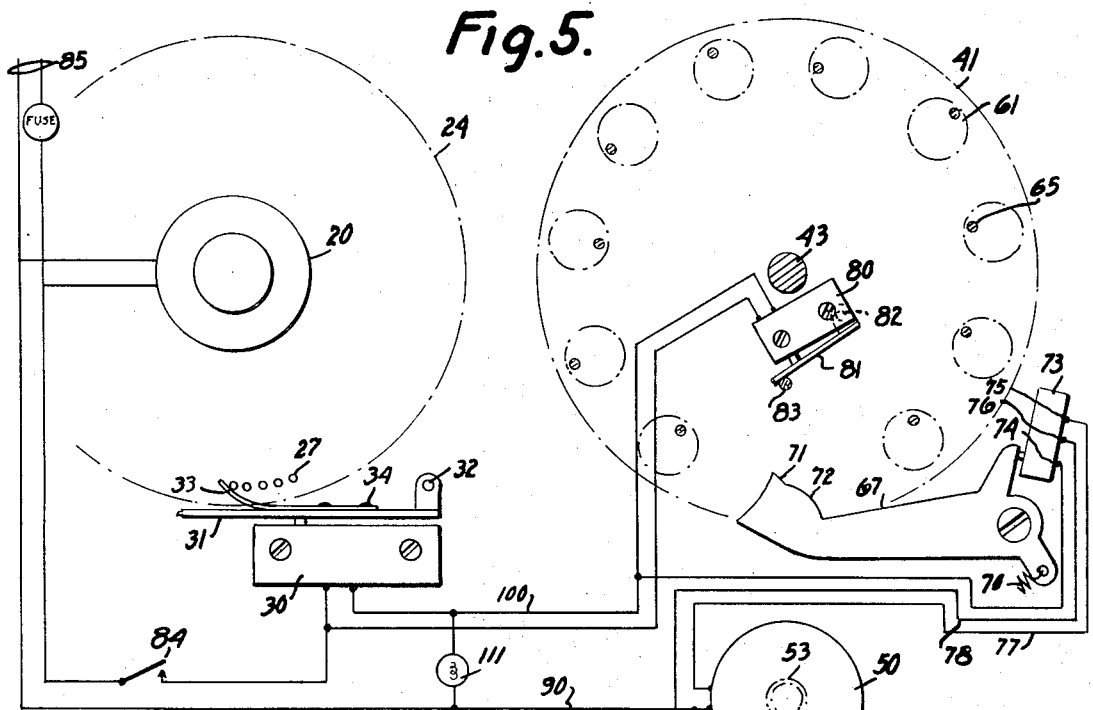
FIG. 5 is a schematic view illustrating the electrical circuitry of the system.

Referring first to FIG. 5, a main water supply pipe 9 carrying water under pressure is connected to the inlet part of a normally closed solenoid controlled valve 10. The outlet part of the latter is connected through a manifold pipe 11 to the inlet parts of a plurality of normally closed solenoid valves 12. The latter are connected to branch pipes 13 to distribute the water evenly throughout the respective areas.

The valves 10 and 12 are of conventional construction. Each valve 12 is opened by completing a circuit through respective electric line 15 connected to the solenoid thereof. As will appear later, the control system is effective to sequentially energize the various lines 15 for different periods of time and thus sequentially open the valves 12 to ten different branch pipes, although only four are shown.

Figure 1:
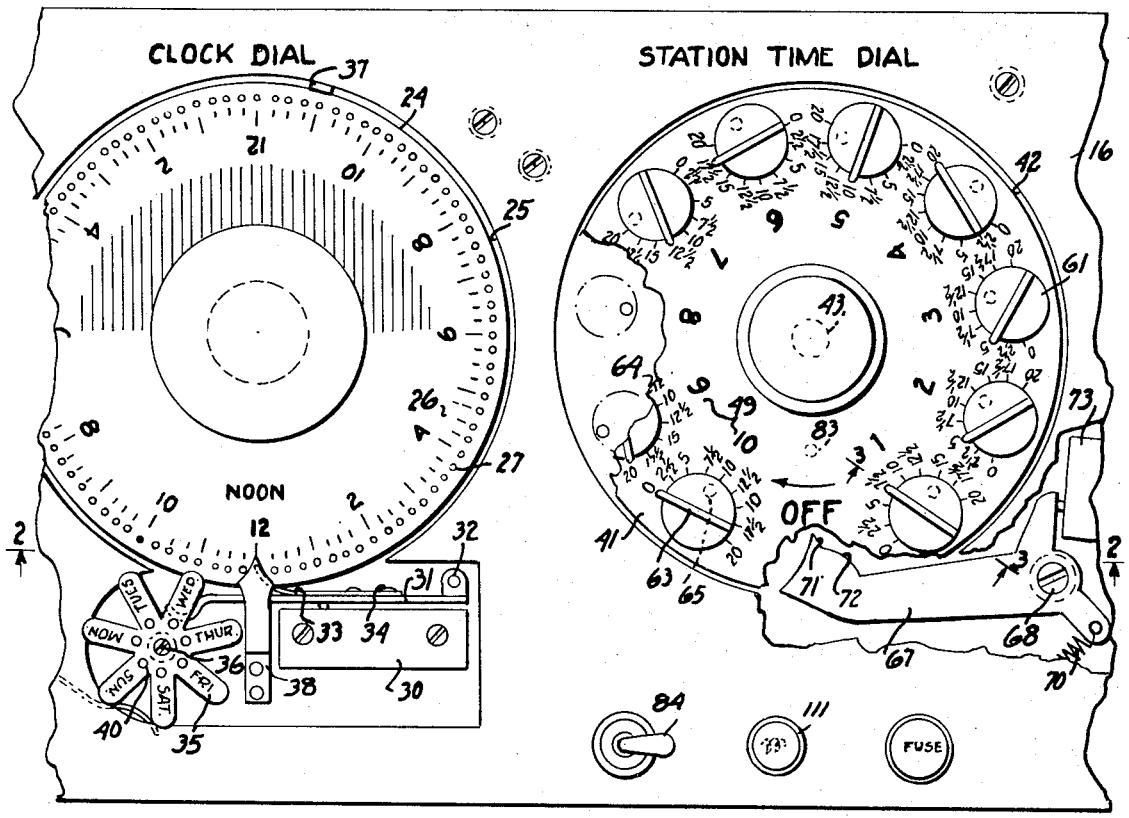
FIG. 1 is a plan view of a timing control device embodying a preferred form of the present invention.
Figure 2:
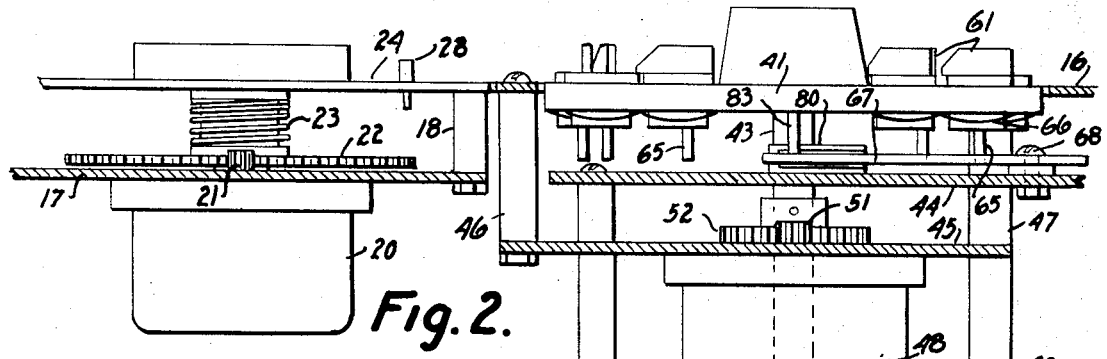
FIG. 2 is a sectional view taken substantially along the line 2—2 of FIG. 1.
Figure 8:
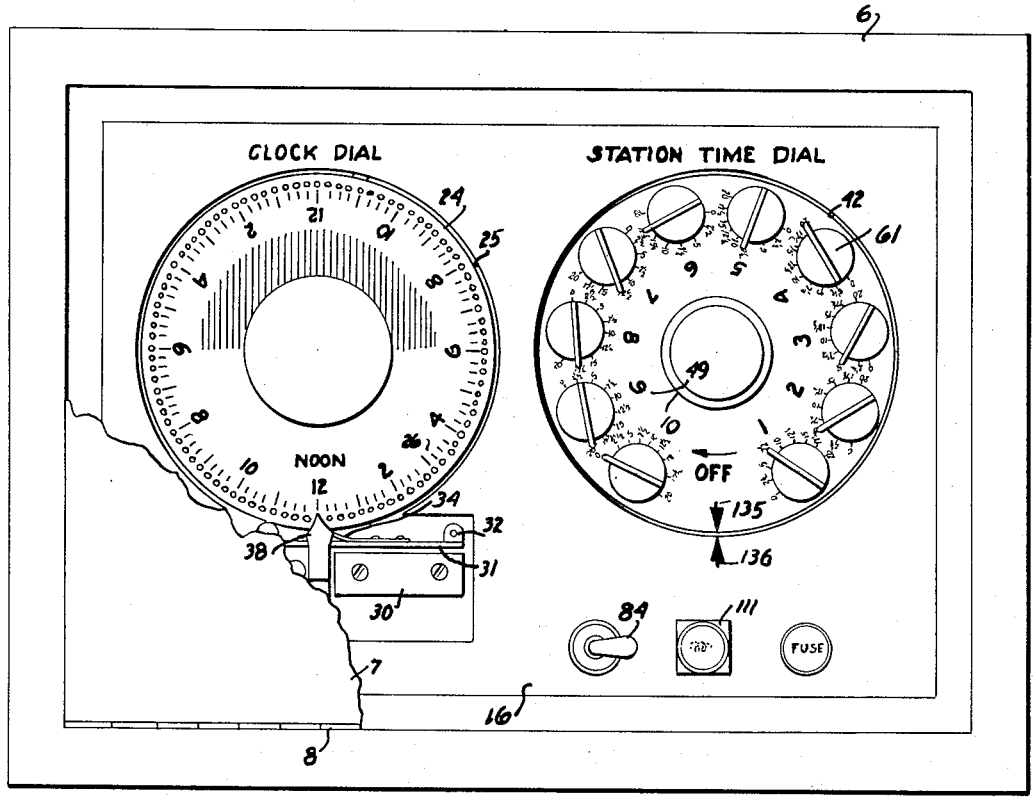
FIG. 8 is a plan view of the timing control device.

Referring now in particular to FIGS. 1, 2 and 8, the timing control device is mounted on a frame plate 16 suitably secured within an opening in a housing 6. A cover 7 is hinged at 8 to the housing 6, permitting access to the device. A support plate 17 is mounted in spaced relation to the plate 16 by post, one of which is shown at 18.

In order to initiate a sequence of watering operations in the different areas to be controlled by the system, a 24 hour clock motor 20 is mounted on the frame plate 17 and has an output pinion 21 which meshes with a large gear 22 rotatably supported by the plate 17 and connected through a suitable friction coupling 23 to a 24 hour time disk 24, the latter extending through an opening 25 in the plate 16.

The disk 24 is divided into 24 hour sections and each hour section is further divided by indicia 26 into 15 minute periods. A row of holes 27 is arranged around the periphery of the disk, the holes being aligned with the indicia 26 and adapted to receive pins, one of which is shown at 28.

A normally open microswitch 30 is mounted on the plate 17 and is controlled by a switch arm 31 pivotally supported at 32. A curved spring leaf 33 is secured to the arm 31 at 34 and is adapted to be engaged at its free end by a pin 28 to normally rock the arm 31 counterclockwise to close the switch 30 for a short period of time, thereby initiating the watering sequence, as will appear later.

Means are provided to selectively prevent initiation of a watering operation on certain days of the week, and for this purpose, a star wheel 35 is rotatably supported at 36 on the plate 17 and has seven arms, one for each day of the week. An ear 37 on the time disk 24 is effective to advance the star wheel 35 one increment as the disk 24 passes through the period of 12:00 a.m. registration relative to an index member 38. Holes 40 are formed in the different arms of the star wheel 35 to receive pins similar to pins 28.

If it is desired to prevent watering on a certain day, for example Sunday, a pin is placed in the appropriate hole 40 of the star wheel, and on Sunday such a pin will be located directly in front of the free end of the switch arm 31, thereby preventing the arm 31 from being rocked to close the switch 30 on that day. In this case the spring leaf 33 will merely yield.

Describing now the timing device for controlling the duration of watering in each of the different areas served by the various branch pipes 13, a rotor disk 41 is located in an opening 42 formed in the frame plate 16 and is mounted on a shaft 43 journaled in bearings formed in frame plates 44 and 45 which are supported at different distances from the plate 16 by posts, i.e., 46 and 47. The shaft 43 and rotor disk 41 are arranged to be driven by either of two motors 48 and 50 (see also FIG. 5). The motor 48 has an output pinion 51 which meshes with a gear 52 fixed to the shaft 43 and is effective to rotate the disk at a relatively slow speed, i.e., one revolution per hour. The motor 50 has an output gear 53 which also meshes with the gear 52 and is effective to rotate the disk 41 at a relatively fast speed, i.e., one revolution per minute.

A switch arm 54 (FIGS. 2 and 6) of non-conducting material is secured to the lower end of a shaft 43a which is suitably coupled to shaft 43 and has attached thereto a three fingered contact brush 55 arranged to wipe over a series of contacts 56 formed on a printed circuit board 57 of non-conductive material. The board 57 is supported from the frame plate 45 by posts, i.e., 58 and 60. The brush 55 is in continual contact with a ring contact 57 which is electrically connected to a conductor 39.

Shortly after rotation of the disk 41 is initiated, the brush 55 wipes over a second interrupted ring contact 110 to complete a circuit from the 24 volt secondary winding of a transformer 29, through conductor 39, conductor 69 (FIGS. 5 and 6) connected to contact 110, thence through the solenoid of valve 10 and through conductor 86 to open valve 10 so that water pressure will be applied to the pipe 11 throughout the cycle. At the completion of the cycle the circuit through conductor 69 is broken to close valve 10 so as to remove water pressure from the entire watering system.

It will be noted that as the rotor disk 41 rotates to bring different stations, as indicated by station numbers 49, into controlling location relative to a switch control arm 67 as will appear later, the brush 55 will complete a circuit from the conductor 39 and ring contact 57, through different respective ones of the contacts 56 and conductors 15 (FIGS. 5 and 6) to the solenoids of respective valves 12 and through the common conductor 86 so as to open the valves 12, one at a time.

As a new station arrives at the controlling location the high speed motor 50 will be deenergized and the low speed motor 48 will be energized, as will appear presently.

Figure 3:
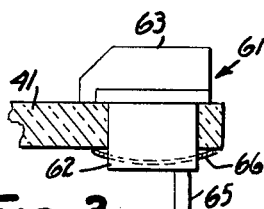
FIG. 3 is an enlarged sectional view illustrating one of the timing control knobs and is taken along line 3—3 of FIG. 1.
Figure 4:
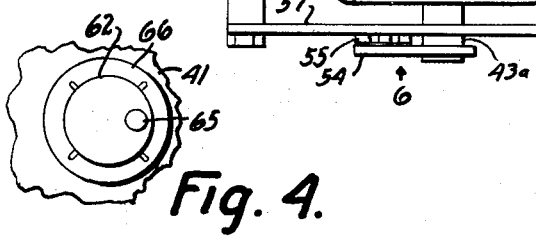
FIG. 4 is a bottom plan view showing the knob of FIG. 3.

Describing now the means for selectively controlling the duration of time during which the motor 48 is energized, a series of ten timing knobs 61 are located around the disk 41, one at each numbered controlling station. As seen in FIGS. 3 and 4, each knob 61 has a shank 62 rotatably journaled in a bearing formed in the disk 41, the shank being integral at its upper end with a pointer 63 which is settable relative to the indicia 64 formed on the upper surface of the disk and calibrated in minutes. Thus, each knob 61 may be set to indicate the duration of watering time for an area respective to that particular knob. For this purpose, a depending pin 65 is integrally formed on the shank 62 of each knob 63 and extends eccentrically of the axis of rotation of such knob. A thin annular dished spring lock member 66 is pressed over the shank 62 to frictionally engage the under surface of the rotor disk 41. The inner edge of the lock member 66 grips the shank 62 and thus forms a yieldable detent to hold the knob 61 in any position in which it is set.

The switch lever 67 (FIGS. 1 and 2), is pivotally supported at 68 on the frame plate 44 and is held in the path of the various control knob pins 65 by a tension spring 70. The free end of the lever 67 has a camming surface thereon successively engageable by the different pins 65. Such surface comprises a short, straight section 71 and a curved section 72 joining the former. The lever 67 controls a class C microswitch 73 which is mounted on the frame plate 44 and which effectively forms both a normally open and a normally closed switch.

When the switch lever 67 is in its extreme clockwise rocked position (shown in FIGS. 1 and 5), it causes the switch 73 to complete a circuit from a common terminal 74, through contacts (not shown), to a terminal 75 which is connected by line 77 to the fast speed motor 50. Thus, the disk 41 will be advanced clockwise at a relatively rapid rate. At this time a circuit is opened through contacts (not shown) between the common terminal 74 and a switch terminal 76 which is connected by line 78 to the slow speed motor 48.

A normally closed cycle maintaining microswitch 80 is mounted on the support plate 44 is a controlled by a switch arm 81 pivoted at 82. Switch 80 is normally held open by a pin 83 which is attached to the rotor disk 41 and engages the arm 81, as shown, when the control system has completed its cycle.

It will be noted that the switches 30 and 80 are connected in parallel and between the right hand side of a power supply circuit 85 and the switch terminal 74. The clock motor 20 is connected directly across the circuit 85.

Describing now the operation of the control circuit and assuming that the device has completed a cycle of operation and thus both switches 30 and 80 are open, and a settable switch 94 is closed, the system will remain inoperative until a pin 28 on the clock disk 24 actuates the switch arm 31 thus closing switch 30 to establish a circuit from the right hand side of the power circuit 85, through switch 84, switch 30, line 100, switch terminal 74, switch 73, switch terminal 75, line 77, motor 50 and lines 90 to the left hand side of the power supply circuit 85. The motor 50 will now drive the disk 41 clockwise from a reference position shown in FIGS. 1, 5 and 8, wherein index mark 135 is opposite index mark 136, at a relatively high speed until the switch lever 67 is engaged by the pin 65 of the next adjacent knob 61, providing such knob is set at any other setting than zero. This establishes the aforementioned controlling location. However, if the knob 61 is set at zero, the switch arm will not be engaged by the pin 65 and the rotor will thus continue until the lever 67 is engaged by the pin of the next knob 61 which is set at other than zero. At such time, the switch lever 67 will be rocked counterclockwise to cause the switch 73 to open the circuit to the high speed motor 50 and close the circuit to the slow speed motor 48. At this time, the switch arm 54 will complete a circuit through a corresponding contact 56 to energize the respective solenoid valve 12.

It will be noted that the duration of time during which each solenoid valve 12 is held energized is dependent upon the orbited position of the pin 65 which is in engagement with the switch lever 67. That is, as a knob 61 is rotated to different settings, its pin 65 will be swung different distances away from the center of the rotor disk 41 and it will there-fore be effective to hold the switch lever actuated for different periods of time as the disk 41 is slowly rotated by the motor 48.

It will be noted that the camming surfaces 71 and 72 on the arm 67 are formed non-linearly so that the indicia 64 may be spaced as shown.

When a pin 65 passes from engagement with the arm 67, the spring 70 will return the arm clockwise to control switch 73 to deenergize the motor 48 and energize the high speed motor 50, thus advancing the rotor 41 at a relatively high rate of speed until the next control knbo 61 is in controlling location to actuate the switch arm 67 whereby to open the next valve 12.

A lamp 111 is connected between line 90 and line 100 to indicate when the control device is passing through a cycle.

Before a pin 28 on the clock disk 24 releases the switch 30 to move to its normally open condition at the start of a cycle, the pin 83 will have passed over the switch arm 81, thereby allowing the switch 80 to remain closed until all ten knobs 60 have passed over the switch arm 67, at which time the pin 83 will again engage the switch arm 81 of switch 80 to open the circuit to switch 73 and thus complete the cycle.

DESCRIPTION OF ALTERNATIVE EMBODIMENT

Figure 7:
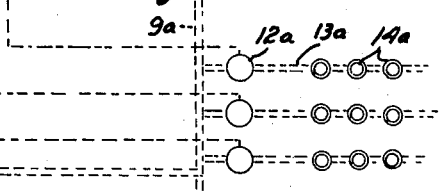
FIG. 7 is a sectional view through a modified form of the invention incorporating a fluid-type area selecting device.

FIG. 7 illustrates a modified form of the invention in which water pressure is utilized to successively control the distribution of water to various areas. Such arrangement is similar to that disclosed in my above noted U.S. Pat. No 3,234,448 and reference may be had to such patent for details of the valves and other components not specifically disclosed here.

A main pipe 9a containing water under pressure is connected to the inlet parts of various fluid pressure controlled valves 12a having their output parts connected to branch pipes 13a. Sprinkler heads 14a are connected at different points to the various branch pipes 13a.

Figure 6:
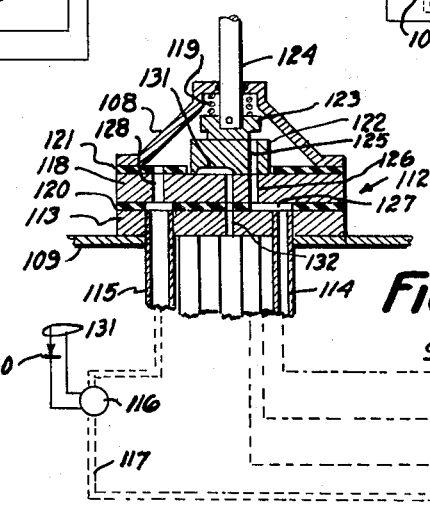
FIG. 6 is a bottom plan view of the area selecting switch and is taken in the direction of the arrow 6 in FIG. 2.

In this form the switch arm 54 and printed circuit board 57 of FIGS. 2 and 6 are omitted and a frame plate 109 carrying a fluid distributor, generally indicated at 112, are mounted in their place on posts, like 58 and 60. The distributor comprises a plate 113 in which one end of each of a number of tubes 114 terminate, the opposite ends of the tubes being connected to the pressure control ports in respective ones of the various valves 12a. An additional tube 115 terminates in the plate 113 and is connected at its opposite end to the outlet port of a normally closed solenoid operated valve 116, similar in construction to valve 10 of FIG. 5. A tube 117 is connected between the outlet port of valve 116 and the supply pipe 9a.

A second plate 118 having gaskets 120 and 121 on opposite sides thereof is suitably clamped between the plate 113 and and end bell 108. A distributor disk 122 is rotatably mounted on top of plate 118 and extends within an opening in the gasket 121. The disk 122 is suitably attached to a drive member 123 carried by a shaft 124 which is suitably coupled to the rotor shaft 43 and is yeildably held against the plate 118 by a compression spring 119. The disk 122 has a passage 125 therethrough effective to communicate with any of a circular row of holes 126 formed in plate 118, the holes communicating with respective ones of the tubes 114 through radially extending slots 127 formed in the gasket 120.

The tube 115 communicates with the interior of the distributor through a passage 128 so that when the valve 116 is open, fluid pressure is applied through passage 125 in the disk 122 and through an aligned hole 126 in plate 118 to open a respective valve 12a.

The solenoid of valve 116 is connected in circuit with a diode 130 and lines 131 (also see FIG. 5) across the terminals of the slow speed motor 48 so that after a cycle has commenced and the slow speed motor 48 is energized, the valve 116 will be opened permitting water under pressure to be applied to an appropriate branch pipe 13a. Subsequently, when the rotor 41 is advanced to a new station position to control watering in a new area, the disk 122 will align the passage 125 with a new tube 114 to open a respective valve 12a. At this time, the water pressure which previously held the preceding valve 12a open will be released through a vent channel 131 in the disk 122 and into a central drain passage 132, thereby allowing such preceding valve to close.

The control system of FIG. 7 may be readily modified to employ normally open valves in lieu of the normally closed valves 12a. In such case, the outlet part of valve 116 is connected by a suitable tube, not shown, to the passage 132 in plate 113 and the tube 115 is connected to the atmosphere. Thus, the distributor cap 122 transfers water under pressure to all of the normally open valves to close the same except that valve whose control part is in communication with passage 125. The latter now acts along with tube 115, as a drain passage to permit the respective valve to remain open.

I claim:

1. A control system for controlling the flow of fluid in a pipe having a valve therein comprising means including a movable control element for controlling said valve;

a rotatable carrier, motor means for rotating said carrier, a timing device supported by said carrier for adjustment about an axis eccentric to the axis of rotation of said carrier, an a projection carried by said timing device and engageable with said control element, said projection extending eccentric to the axis of adjustment of said timing device whereby to engage said control element for different periods of time depending on the adjustment of said timing device.

2. A control system according to claim 1 wherein said control element comprises a camming surface engageable by said projection.

3. A control system according to claim 2 wherein said camming surface is non-linear.

4. A control system according to claim 1 wherein said carrier comprises a disk having a bearing therein, and said timing device comprises a knob rotatably mounted in said bearing, said projection extending from said knob on one side of said disk, and indicia on the opposite side of said disk for indicating the extent of adjustment of said knob.

5. A control system according to claim 4 comprising a friction device extending between said knob and said disk for maintaining said knob in any adjusted position on said disk.

6. A control system for controlling the flow of fluid from a main supply pipe to a plurality of branch pipes, including control valves for respective ones of said branch pipes, and a rotatable control unit having a plurality of timing stations therearound;

a first motor for rotating said control unit, a second motor for rotating said control unit at a slower speed than said first motor, a first circuit for energizing said first motor, a normally closed first switch in said first circuit, a second circuit for energizing said second motor, a normally open second switch in said second circuit, control means for said switches, and timing devices on said control unit at each of said timing stations, each of said timing devices being effective when a said timing station is passing a reference position to actuate said control means whereby to open said first switch and close said second switch, each of siad timing devices being selectively adjustable relative to said control unit whereby to vary the time during which said first switch is open and said said second switch is closed.

7. A control system according to claim 6 wherein each of said timing devices comprises a manually settable timing member carried by said control unit, and an actuator carried by each of said timing devices for actuating said control means, each of said timing members being adjustable to radially locate said actuator in different paths relative to said control means whereby to vary the period of time during which said first switch is open and said second switch is closed.

8. A control system according to claim 6 comprising indicia calibrated in minutes of time for indicating the adjusted positions of said timing devices.

9. A control system according to claim 6 wherein said timing devices each comprises a knob rotatably supported by said control unit, an actuator carried by said knob eccentrically of the axis of rotation of said knob, said knob being effective to adjust the path of movement of said actuator to engage said control means for different periods of time whereby to vary the period of time during which said first switch is open and said second switch is closed.

10. A control system according to claim 6 wherein said control means comprises a control member having a non-linear camming surface engagable by successive ones of said actuators.

11. A control system according to claim 6 wherein each of said timing devices is settable to a position to locate the respective said actuator out of cooperative relation with said control means.

* * * * *